United States Patent
Yoshida (10) Patent No.: US 9,382,148 B2
(45) Date of Patent: Jul. 5, 2016

(54) POROUS GLASS BASE MATERIAL THERMAL INSULATING MEMBER AND SINTERING METHOD

(71) Applicant: Shin-Etsu Chemical Co., Ltd., Tokyo (JP)

(72) Inventor: Makoto Yoshida, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 516 days.

(21) Appl. No.: 13/743,355

(22) Filed: Jan. 17, 2013

(65) Prior Publication Data

US 2013/0186147 A1  Jul. 25, 2013

(30) Foreign Application Priority Data

Jan. 19, 2012  (JP) .................................. 2012-009113

(51) Int. Cl.
| | |
|---|---|
| *C03B 37/025* | (2006.01) |
| *C03B 37/012* | (2006.01) |
| *F16L 59/00* | (2006.01) |
| *C03B 37/014* | (2006.01) |

(52) U.S. Cl.
CPC ......... *C03B 37/0126* (2013.01); *C03B 37/0146* (2013.01); *C03B 37/01486* (2013.01); *F16L 59/00* (2013.01)

(58) Field of Classification Search
CPC .................................................. C03B 37/0126
USPC ........................................................ 65/427
See application file for complete search history.

(56) References Cited

U.S. PATENT DOCUMENTS

2003/0205068 A1* 11/2003 Taru et al. ........................ 65/537
2005/0066690 A1*  3/2005 Yamashita et al. .............. 65/382

FOREIGN PATENT DOCUMENTS

| JP | H7-223833 A | 8/1995 |
|---|---|---|
| JP | 3017990 B1 | 3/2000 |
| JP | 2000-219519 A | 8/2000 |
| JP | 2002-047014 A | 2/2002 |
| JP | 2006-265029 A | 10/2006 |
| JP | 2009-155157 A | 7/2009 |

OTHER PUBLICATIONS

Office Action issued for counterpart Japanese Application 2012-009113, issued by the Japanese Patent Office on Jul. 17, 2014.
Notice of Office Action for Chinese Patent Application No. 201310012690.8, issued by the State Intellectual Property Office of China on Sep. 26, 2014.

* cited by examiner

*Primary Examiner* — Angela Ortiz
*Assistant Examiner* — Cynthia Szewczyk (57) ABSTRACT

In order to prevent thermal deformation of a thermal insulating board and scattering of radiant heat when sintering porous glass base material, provided is a thermal insulating member is arranged on a dummy rod above a porous glass base material, which is formed by depositing glass fine particles on the outside of a starting member formed by connecting the dummy rod to at least one end of a core rod, when heating the porous glass base material to achieve sintering. The thermal insulating member comprises a cylindrical insulating cylinder; an insulating upper board connected to a top end of the insulating cylinder; an insulating lower board connected to a bottom end of the insulating cylinder; and a thermal deformation preventing member that prevents thermal deformation of at least one of the insulating cylinder, the insulating upper board, and the insulating lower board.

6 Claims, 7 Drawing Sheets

POROUS GLASS BASE MATERIAL THERMAL INSULATING MEMBER AND SINTERING METHOD

The contents of the following Japanese patent application are incorporated herein by reference:
NO. 2012-009113 filed on Jan. 19, 2012.

BACKGROUND

1. Technical Field

The present invention relates to a sintering method and a thermal insulating member for a porous glass base material suitable for sintering the porous glass base material, which is the raw material for an optical fiber, to achieve dehydration and transparent vitrification.

2. Related Art

Optical fiber uses a porous glass base material, which is primarily quartz glass, as raw material. The porous glass base material is sintered, and resulting optical fiber base material that has undergone dehydration and transparent vitrification is stretched to have a prescribed diameter, thereby obtaining an optical fiber preform. The optical fiber preform is drawn by a drawing machine to obtain optical fiber.

Conventionally, in order to manufacture the porous glass base material, various methods have been proposed. Among these methods, there are external techniques (OVD) that include moving the starting member and a plurality of burners back and forth relative to each other while rotating the starting member, which is obtained by fusing a cylindrical core rod to dummy rods at both ends, around its axis. The resulting structure is then dehydrated and sintered in an electric furnace. This OVD method can be used to obtain a structure with almost any refractive index distribution and to mass produce optical fiber base material with a large diameter, and is therefore used often.

The porous glass base material obtained in this manner has a trunk portion at the center thereof and cone-shaped portions at the ends. A sintering apparatus that includes a heating furnace around a furnace tube is used for the sintering, the porous glass base material is rotated in the axial direction, and the center of the furnace tube moves vertically downward. While this is happening, the heat source of the heating furnace provides heat to achieve the dehydration and transparent vitrification.

Figure 1:
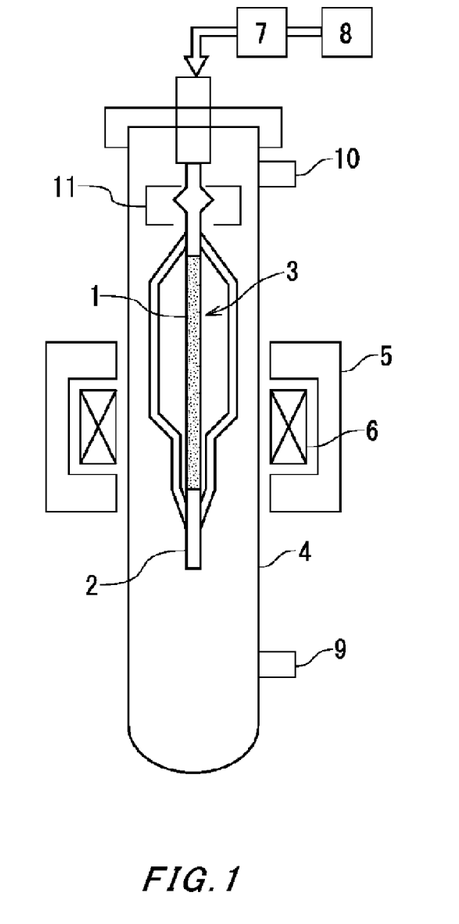
FIG. 1 is a schematic vertical cross-sectional view of an exemplary sintering apparatus.

The porous glass base material sintering apparatus is shown in FIG. 1, and contains a porous glass base material 3, which is formed by depositing glass fine particles on the outside of the starting member formed by connecting dummy rods 2 to both ends of a core rod 1, arranged within a furnace tube 4. The porous glass base material 3 is heated and sintered by a heater 6 that is protected by an insulation material 5 and arranged on the outer circumference of the furnace tube 4. A driving source 7 causing the porous glass base material 3 to pass through the heating region and a rate control apparatus 8 connected to the driving source 7 for increasing and decreasing the lowering speed are provided on the top portion of the sintering apparatus. A gas inlet tube 9 is attached below the furnace tube 4, and is connected to a source (not shown) that supplies chlorine gas, which is the gas for the dehydration reaction, and a source (not shown) supplying helium gas, which is an inert gas. A exhaust tube 10 is attached above the furnace tube 4.

The sintering of the porous glass base material is realized in the following manner. Chlorine gas and helium gas are supplied from the respective sources (not shown), mixed together while passing through a gas inlet tube 9, and injected into the furnace tube 4. The porous glass base material 3 is controlled by the rate control apparatus 8 to be lowered at low speed while being axially rotated by the driving source 7 and passes through the heating region that generates heat using the heater 6, thereby being sintered to undergo the dehydration and transparent vitrification processes.

At this time, in a conventional sintering apparatus, a large amount of radiant heat scatters up and down from the cone-shaped portions at the ends of the porous glass base material. As a result, the sintering is insufficient near the ends of the base material, and non-uniformity occurs in the processing. Furthermore, natural counter flow occurs in the furnace tube and the pressure fluctuation cannot be controlled, which results in water entering into the furnace tube, leading to a drop in quality.

As a method for solving this problem, Patent Document 1 proposes preventing the scattering of the radiant heat by arranging a ring-shaped thermal insulation board at the cone-shaped portion on the top portion of the porous glass base material. This method does solve the problem described above, but the heat during the sintering causes the thermal insulating board to deform, and this results in a new problem, which is that sufficient performance cannot be achieved unless the thermal insulating board is replaced frequently.

Patent Document 1: Japanese Patent No. 3017990

In order to solve the above problems, it is an objective of the present invention to provide a sintering method and a thermal insulating member for a porous glass base material that can prevent deformation of a thermal insulating board due to heat and also safely prevent scattering of radiant heat when sintering the porous glass base material.

SUMMARY

According to a first aspect of the present invention, provided is a thermal insulating member that is arranged on a dummy rod above a porous glass base material, which is formed by depositing glass fine particles on the outside of a starting member formed by connecting the dummy rod to at least one end of a core rod, when heating the porous glass base material to achieve sintering, the thermal insulating member comprising a cylindrical insulating cylinder; an insulating upper board connected to a top end of the insulating cylinder; an insulating lower board connected to a bottom end of the insulating cylinder; and a thermal deformation preventing member that prevents thermal deformation of at least one of the insulating cylinder, the insulating upper board, and the insulating lower board.

The thermal deformation preventing member may include a cylindrical inner cylinder that is arranged within the insulating cylinder and connects the insulating upper board to the insulating lower board. The thermal deformation preventing member may include a plurality of pillar members that are arranged within the insulating cylinder and connect the insulating upper board to the insulating lower board. The thermal deformation preventing member may include a reinforcing board that is arranged on at least one surface of the insulating upper board and the insulating lower board. The thermal deformation preventing member may include beam members that extend radially and are arranged on at least one surface of the insulating upper board and the insulating lower board. The insulating upper board and/or the insulating lower board may be formed of non-transparent quartz material or material obtained by sand-blasting transparent quartz glass.

According to a first aspect of the present invention, provided is a method of sintering a porous glass base material, which is formed by depositing glass fine particles on the outside of a starting member formed by connecting a dummy rod to at least one end of a core rod, comprising using the thermal insulating member for the porous glass base material according to claim 1 when heating the porous glass base material to achieve sintering.

By using the thermal insulating member that includes the thermal deformation preventing member of the present invention when sintering, the thermal insulating board forming the thermal insulating member does not deform, the scattering of radiant heat from the porous glass base material can be prevented, and an optical fiber base material can be obtained having stable optical characteristics over the length thereof.

DESCRIPTION OF EXEMPLARY EMBODIMENTS

Figure 2:
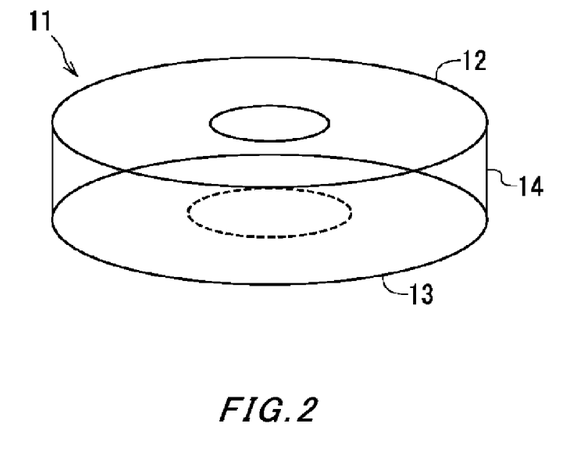
FIG. 2 is a schematic perspective view of a conventional thermal insulating member.
Figure 3:
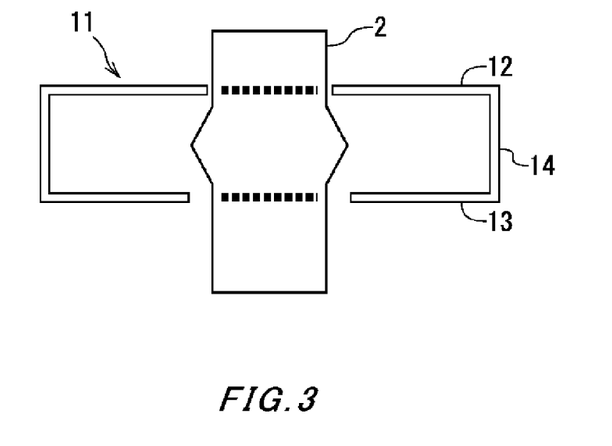
FIG. 3 is an enlarged schematic cross-sectional view of a conventional thermal insulating member attached to a dummy rod portion of the top of the porous glass base material.
Figure 4:
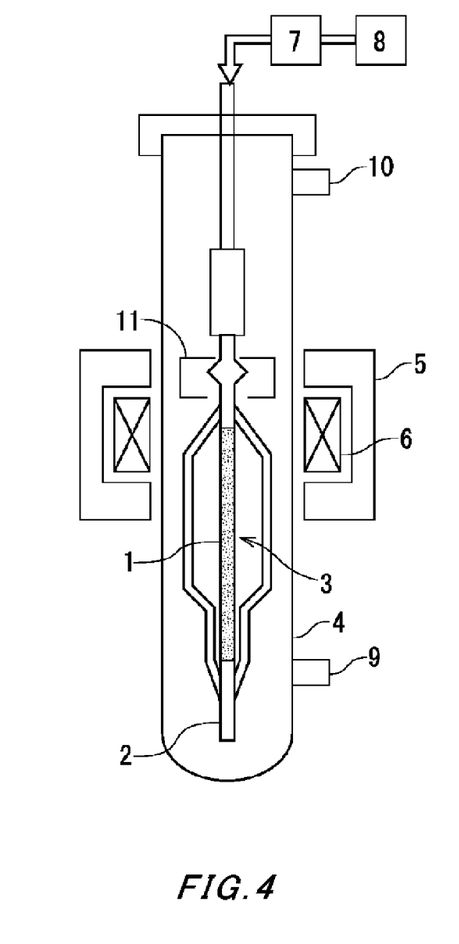
FIG. 4 is a schematic vertical cross-sectional view of the sintering apparatus during the latter half of sintering.
Figure 5:
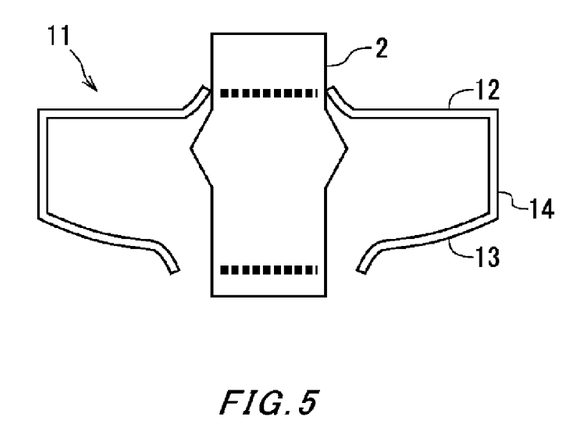
FIG. 5 is a schematic cross-sectional view of a state in which a conventional thermal insulating member is deformed by radiant heat.

In order to solve the above problems, first, a thermal insulating member 11 that includes a circular insulating cylinder 14 such as shown in FIG. 2 is attached in a manner to cover a protrusion provided on a dummy rod, as shown in FIG. 3, and the porous glass base material 3 is passed from the bottom up through a heating region of a sintering apparatus shown in FIG. 1. During the latter half of the sintering shown in FIG. 4, since the thermal insulating member 11 is brought near the heater 6, the internal circumferential edge of the insulating upper board 12 or the entire insulating lower board 13 that receive more heat than other portions deform, as shown in FIG. 5, and therefore must be replaced after a short usage time.

Figure 6:
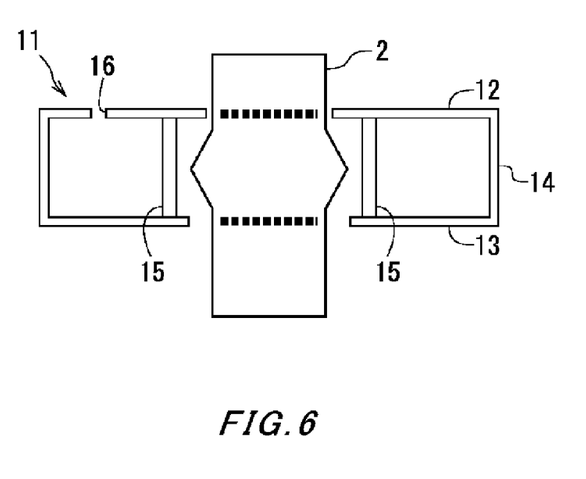
FIG. 6 is a schematic cross-sectional view of a cylindrical thermal insulating member according to an embodiment of the present invention.

Therefore, the thermal insulating member of the present embodiment solves this problem by adopting a thermal deformation prevention structure, which is an insulating cylinder including an insulating upper board and an insulating lower board. The following describes the thermal deformation prevention structure of the porous glass base material 3 of the present embodiment, with reference to FIGS. 6 to 11. As shown in FIG. 6, the thermal insulating member 11 is arranged to encompass the porous glass base material 3. The thermal insulating member 11 includes the insulating upper board 12, the insulating lower board 13, the insulating cylinder 14, and a inner cylinder 15, which is an example of a thermal deformation member. The insulating upper board 12 and the insulating lower board 13 are formed as ring board that include a circular hole in the middle thereof, through which the insulating lower board 13 passes. The insulating cylinder 14 is formed as a cylinder. The top end of the insulating cylinder 14 is connected to the insulating upper board 12. The bottom end of the insulating cylinder 14 is connected to the insulating lower board 13. The inner cylinder 15 is formed as a cylinder. The outer diameter of the inner cylinder 15 is less than the inner diameter of the insulating cylinder 14. The inner cylinder 15 is arranged within the insulating cylinder 14. The top end of the inner cylinder 15 is connected to the insulating upper board 12. The bottom end of the inner cylinder 15 is connected to the insulating lower board 13. In this way, the inner cylinder 15 functions as a reinforcing member that reinforces the insulating upper board 12, the insulating lower board 13, and the insulating cylinder 14. Accordingly, deformation of the thermal insulating member 11, the insulating upper board 12, the insulating lower board 13, and the insulating cylinder 14 due to heat is prevented. A gas outlet hole 16 is preferably formed in one of the insulating upper board 12, the insulating lower board 13, the insulating cylinder 14, and the inner cylinder 15. In this way, the space enclosed by the insulating upper board 12, the insulating lower board 13, the insulating cylinder 14, and the inner cylinder 15 can be prevented from being blocked, thereby restricting damage to the thermal insulating member 11.

Figure 7:
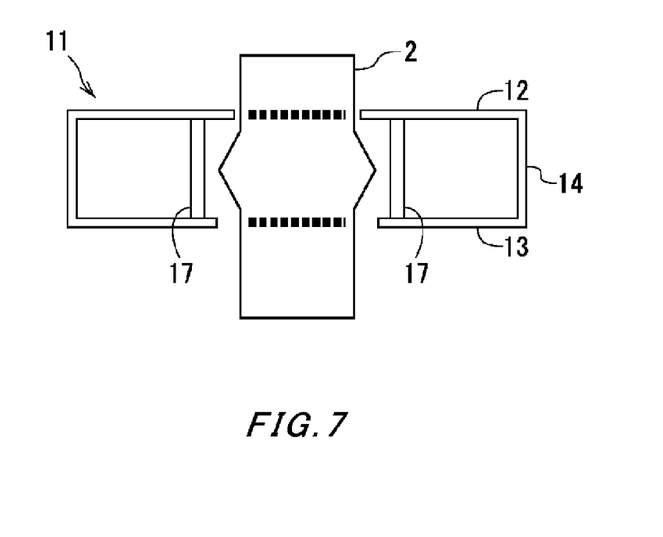
FIG. 7 is a schematic cross-sectional view of a pillar-type thermal insulating member according to an embodiment of the present invention.
Figure 8:
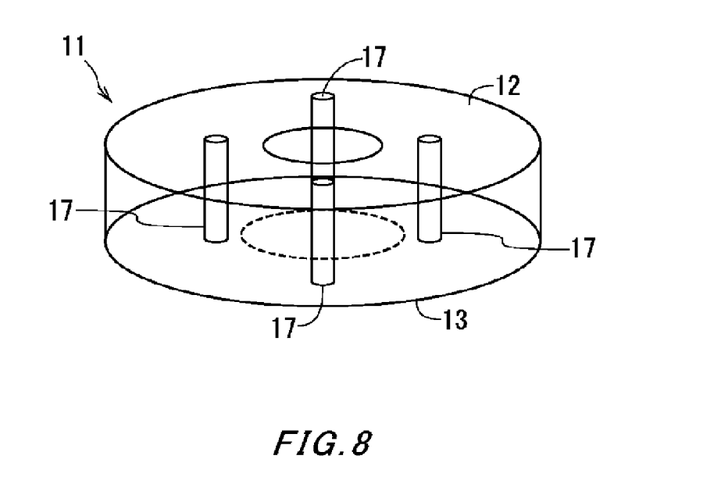
FIG. 8 is a schematic perspective view of FIG. 7.
Figure 9:
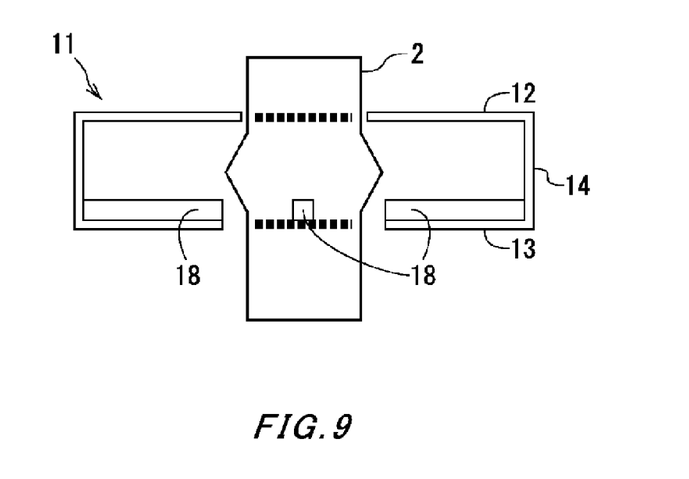
FIG. 9 is a schematic cross-sectional view of a state in which the top surface of the insulating lower board is reinforced with a plurality of reinforcing members extending radially.
Figure 10:
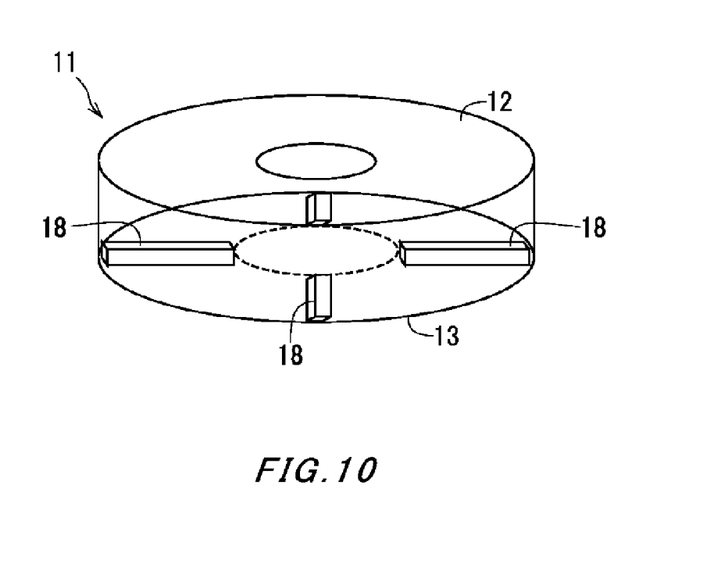
FIG. 10 is a schematic perspective view of FIG. 9.

As another embodiment of the thermal deformation member described above, pillar member s 17 may be provided within the insulating cylinder 14, as shown in FIGS. 7 and 8. The top end of each pillar member 17 is connected to the insulating upper board 12. The bottom end of each pillar member 17 is connected to the insulating lower board 13. With this method, the reinforcing member has less mass, and therefore reinforcement can be achieved without significantly increasing the overall mass. As another example, as shown in FIGS. 9 and 10, a plurality of beam members 18 that extend radially may be provided on the top surface of the insulating lower board 13, as the thermal deformation prevention structure. The beam members 18 may be provided on the bottom surface of the insulating lower board 13, or on the top or bottom surface of the insulating upper board 12. Furthermore, the method shown in FIG. 11 may be used to restrict deformation of the insulating upper board 12 by arranging a reinforcing board 19 that is a ring-shaped board within the insulating upper board 12, in order to form a thick structure. The outer diameter of the exhaust tube 10 may be greater than or equal to the opening diameter D of the insulating lower board 13. The reinforcing board 19 may be provided on the bottom surface of the insulating upper board 12, or on the top or bottom surface of the insulating lower board 13. The material of each member forming the thermal insulating member 11 is lightweight and efficiently blocks heat, and such material can be formed by using non-transparent quartz or material obtained by sand-blasting transparent quartz glass having a heat blocking effect, for example.

The following describes a detailed embodiment of a thermal insulating member according to the present invention, but the present invention is not limited to this, and can be embodied in many ways.

Comparative Example 1

A porous glass base material was prepared by using OVD to deposit glass fine particles up to an outer diameter of 300 mm on the outside of a starting member, which is formed by connecting dummy rods to the ends of a core rod having a length of 200 mm and an outer diameter of 50 mm. A thermal insulating member was attached to the top portion of the porous glass base material, and sintering was performed with a rate of 1.5 mm/min and a temperature of 1500° C. The thermal insulating member used here includes, as top and bottom thermal insulating boards, circular boards formed by sand-blasting transparent quartz glass with a thickness of 5 mm and an outer diameter of 270 mm having an insertion hole in the center thereof through which the porous glass base material is inserted, and also includes an insulating cylinder that is made of sand-blasted transparent quartz glass with a thickness of 5 mm, a height of 100 mm, and an outer diameter of 270 mm and connects the top and bottom thermal insulating plates. As a result, the thermal insulating member began to deform after being used in 20 sintering, and was greatly deformed to the shape shown in FIG. 5 after being used 50 times.

First Embodiment

Figure 11:
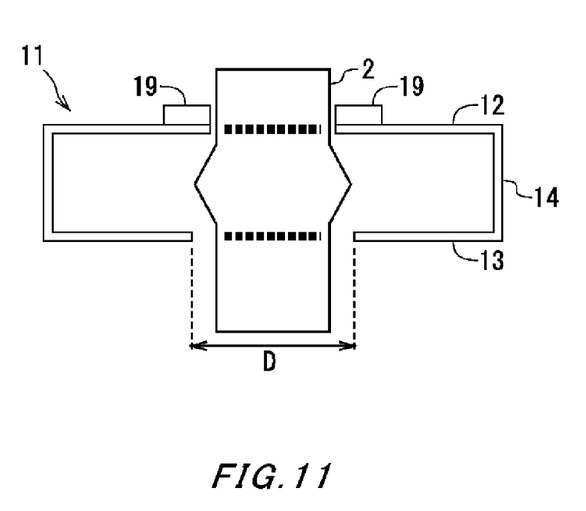
FIG. 11 is a schematic cross-sectional view showing a state in which the insulating upper board is reinforced, with the internal circumferential portion of the insulating upper board serving as a thick portion.

A porous glass base material was prepared in the same manner as the porous glass base material used in the first comparative example, the thermal insulating member was attached, and sintering was performed. A thermal insulating member that was the same as the thermal insulating member used in the first comparative example was prepared, a inner cylinder formed by sand-blasting transparent quartz glass with an internal diameter of 120 mm, a height of 100 mm, and a thickness of 5 mm is arranged within an insulating cylinder, and the insulating upper board and insulating lower board are fused to be connected by the inner cylinder. In addition to this structure, a thick structure, such as shown in FIG. 11, is formed on the inner circumferential portion of the insulating upper board by arranging a reinforcing board 19 with an outer diameter of 150 mm and a thickness of 10 mm having a hole in the center thereof for inserting the base material is arranged on the top surface of the insulating upper board. In addition, three holes with radii of 5 mm were opened in the insulating upper board to serve as gas outlet holes. The resulting structure did not exhibit any deformation, even after being used in 300 sinterings.

Second Embodiment

A porous glass base material was prepared in the same manner as the porous glass base material used in the first comparative example, the thermal insulating member was attached, and sintering was performed. A thermal insulating member that was the same as the thermal insulating member used in the first comparative example was prepared, quartz rod with a height of 100 mm and a diameter of 10 mm were arranged at four positions on a circle with a radius of 150 mm within the insulating cylinder, as shown in FIG. 8, and fused to be connected to the insulating upper board and the insulating lower board, and a thick portion with a thickness of 10 mm was formed on the inner side of the 150 mm inner diameter of the insulating upper board. The resulting structure did not exhibit any deformation, even after being used in 300 sinterings.

Third Embodiment

A porous glass base material was prepared in the same manner as the porous glass base material used in the first comparative example, the thermal insulating member was attached, and sintering was performed. A thermal insulating member that was the same as the thermal insulating member used in the first comparative example was prepared, quartz rod with a height of 100 mm and a diameter of 10 mm were arranged at four positions on a circle with a radius of 150 mm within the insulating cylinder, as shown in FIG. 8, and fused to be connected to the insulating upper board and the insulating lower board, and four bar-shaped beam members with widths of 5 mm are arranged radially on the top surface of the insulating lower board, as shown in FIG. 10. The resulting structure did not exhibit any deformation, even after being used in 300 sinterings.

What is claimed is:

1. A thermal insulating member that prevents scattering of radiant heat when heating, by a heater, a porous glass base material, which is formed by depositing glass fine particles on the outside of a starting member formed by connecting a dummy rod to at least one end of a core rod, to achieve sintering, the thermal insulating member comprising:
    a cylindrical insulating cylinder;
    an insulating upper board connected to a top end of the insulating cylinder;
    an insulating lower board connected to a bottom end of the insulating cylinder; and
    a thermal deformation preventing member that is connected to the insulating upper board and the insulating lower board and prevents thermal deformation of at least one of the insulating cylinder, the insulating upper board, and the insulating lower board, wherein
    the thermal deformation preventing member includes a plurality of pillar members that are arranged within the insulating cylinder and connect the insulating upper board to the insulating lower board.

2. The thermal insulating member for the porous glass base material according to claim 1, wherein
    the thermal deformation preventing member includes a cylindrical inner cylinder that is arranged within the insulating cylinder and connects the insulating upper board to the insulating lower board.

3. The thermal insulating member according to claim 1, wherein
    the thermal deformation preventing member includes a reinforcing board that is arranged on a top surface of the insulating upper board.

4. A thermal insulating member that prevents scattering of radiant heat when heating, by a heater, a porous glass base material, which is formed by depositing glass fine particles on the outside of a starting member formed by connecting a dummy rod to at least one end of a core rod, to achieve sintering, the thermal insulating member comprising:
    a cylindrical insulating cylinder;
    an insulating upper board connected to a top end of the insulating cylinder;
    an insulating lower board connected to a bottom end of the insulating cylinder; and
    a thermal deformation preventing member that prevents thermal deformation of at least one of the insulating cylinder, the insulating upper board, and the insulating lower board, wherein
    the thermal deformation preventing member includes beam members that extend radially and are arranged on a top surface of the insulating lower board.

5. The thermal insulating member for the porous glass base material according to claim 4, wherein
    the thermal deformation preventing member includes a cylindrical inner cylinder that is arranged within the insulating cylinder and connects the insulating upper board to the insulating lower board.

6. The thermal insulating member according to claim 4, wherein the thermal deformation preventing member includes a reinforcing board that is arranged on a top surface of the insulating upper board.

\* \* \* \* \*